(12) United States Patent
Nishigai

(10) Patent No.: US 10,497,956 B2
(45) Date of Patent: Dec. 3, 2019

(54) FUEL CELL APPARATUS, FUEL CELL SYSTEM, AND CONTROL METHOD

(71) Applicant: KYOCERA Corporation, Kyoto-shi, Kyoto (JP)

(72) Inventor: Takanobu Nishigai, Hiratsuka (JP)

(73) Assignee: KYOCERA Corporation, Kyoto (JP)

( * ) Notice: Subject to any disclaimer, the term of this patent is extended or adjusted under 35 U.S.C. 154(b) by 171 days.

(21) Appl. No.: 15/739,252

(22) PCT Filed: Jun. 24, 2016

(86) PCT No.: PCT/JP2016/003062
§ 371 (c)(1),
(2) Date: Dec. 22, 2017

(87) PCT Pub. No.: WO2016/208201
PCT Pub. Date: Dec. 29, 2016

(65) Prior Publication Data
US 2018/0166718 A1    Jun. 14, 2018

(30) Foreign Application Priority Data

Jun. 25, 2015  (JP) .................................. 2015-127823

(51) Int. Cl.
*H01M 8/04858*  (2016.01)
*H01M 8/04302*  (2016.01)
(Continued)

(52) U.S. Cl.
CPC ..... *H01M 8/04858* (2013.01); *H01M 8/0494* (2013.01); *H01M 8/04225* (2016.02);
(Continued)

(58) Field of Classification Search
CPC ......... H01M 8/04858; H01M 8/04225; H01M 8/04302; H01M 8/04619; H01M 8/0494;
(Continued)

(56) References Cited

U.S. PATENT DOCUMENTS

| 6,285,572 | B1 | 9/2001 | Onizuka et al. |
| 8,427,110 | B2 | 4/2013 | Oya |
| 2011/0067819 | A1 | 3/2011 | Oya |

FOREIGN PATENT DOCUMENTS

| JP | H8-171919 A | 7/1996 |
| JP | 2002-247765 A | 8/2002 |
| JP | 2004-173388 A | 6/2004 |
| JP | 2007-273252 A | 10/2007 |

(Continued)

OTHER PUBLICATIONS

International Search Report dated Aug. 9, 2016, issued by Japan Patent Office for International Application No. PCT/JP2016/003062.

(Continued)

*Primary Examiner* — Helen Oi K Conley
(74) *Attorney, Agent, or Firm* — Procopio Cory Hargreaves and Savitch LLP

(57) ABSTRACT

Each fuel cell apparatus among a plurality of fuel cell apparatuses is caused to transmit, as distinguishing information, at least one of a cumulative operating time and a rated power of the respective fuel cell apparatus to other fuel cell apparatuses. Each fuel cell apparatus is caused to receive distinguishing information transmitted by other fuel cell apparatuses. Each fuel cell is caused to select a fuel cell apparatus among the plurality of fuel cell apparatuses to be a master apparatus on the basis the distinguishing information of the respective fuel cell apparatus and the distinguishing information received from other fuel cell apparatuses.

15 Claims, 7 Drawing Sheets

(51) Int. Cl.
*H01M 8/04225* (2016.01)
*H01M 8/04828* (2016.01)
*H01M 8/04992* (2016.01)
*H01M 8/04537* (2016.01)
*H01M 8/249* (2016.01)
*H01M 8/04313* (2016.01)

(52) U.S. Cl.
CPC ... *H01M 8/04302* (2016.02); *H01M 8/04619* (2013.01); *H01M 8/04992* (2013.01); *H01M 8/249* (2013.01); *H01M 8/04313* (2013.01)

(58) Field of Classification Search
CPC ............. H01M 8/04992; H01M 8/249; H01M 8/04313
See application file for complete search history.

(56) References Cited

FOREIGN PATENT DOCUMENTS

| | | |
|---|---|---|
| JP | 2009-43520 A | 2/2009 |
| JP | 2010-114000 A | 5/2010 |
| JP | 2011-67047 A | 3/2011 |
| KR | 10-0686281 B1 | 12/2000 |

OTHER PUBLICATIONS

Written Opinion of the International Searching Authority dated Aug. 9, 2016, issued by Japan Patent Office for International Application No. PCT/JP2016/003062.
Montero et al., Fuel Cell and Power Control for a Hybrid Vehicle. Experimental Results., System Engineering and Automation—University of Seville, Spain, Instituto Nacional de Tecnica Aeroespacial, Spain, 2012 IEEE, 6 pages.

FUEL CELL APPARATUS, FUEL CELL SYSTEM, AND CONTROL METHOD

CROSS-REFERENCE TO RELATED APPLICATION

The present application claims priority to and the benefit of Japanese Patent Application No. 2015-127823 filed Jun. 25, 2015, the entire contents of which are incorporated herein by reference.

TECHNICAL FIELD

The present disclosure relates to a fuel cell apparatus, a fuel cell system, and a control method to control a plurality of fuel cell apparatuses.

BACKGROUND

A power generation apparatus capable of adjusting output of a fuel cell apparatus or the like, for example, is used to supply power to a load in a consumer facility. Improvement in the output of the power generation apparatus is desired. One method for doing so is to operate a plurality of power generation apparatuses in parallel.

Power generation apparatuses each typically include a corresponding control apparatus, and it is conceivable that the control apparatuses could each control their respective power generation apparatus independently. In the case of operating a plurality of power generation apparatuses, it has been proposed to have a single operation control apparatus adjust the output of the plurality of power generation apparatuses to increase the utilization rate of the plurality of power generation apparatuses as a whole and to extend the lifespan of each power generation apparatus (see patent literature (PTL) 1).

CITATION LIST

Patent Literature

PTL 1: JP 2002-247765 A

SUMMARY

Technical Problem

A fuel cell apparatus according to a first aspect of the present disclosure includes a timing unit, a memory, a transmitter, a receiver, and a controller. The timing unit is configured to measure a cumulative operating time of the fuel cell apparatus. The memory is configured to store a rated output of the fuel cell apparatus. The transmitter is configured to transmit, as distinguishing information, at least one of the cumulative operating time measured by the timing unit and the rated output stored in the memory to other fuel cell apparatuses among a plurality of fuel cell apparatuses that supplies power together with the fuel cell apparatus to a load in a consumer facility. The receiver is configured to receive at least one of a cumulative operating time and a rated output of the other fuel cell apparatuses from the other fuel cell apparatuses as distinguishing information for the other fuel cell apparatuses. The controller is configured to select a fuel cell apparatus among the plurality of fuel cell apparatuses to be a master apparatus on the basis of the distinguishing information of the respective fuel cell apparatus and the distinguishing information received from the other fuel cell apparatuses, wherein the master apparatus controls itself and other fuel cell apparatuses in accordance with power consumption of the load.

DETAILED DESCRIPTION

Embodiments of a control method to which the present disclosure is applied are described below with reference to the drawings.

Figure 1:
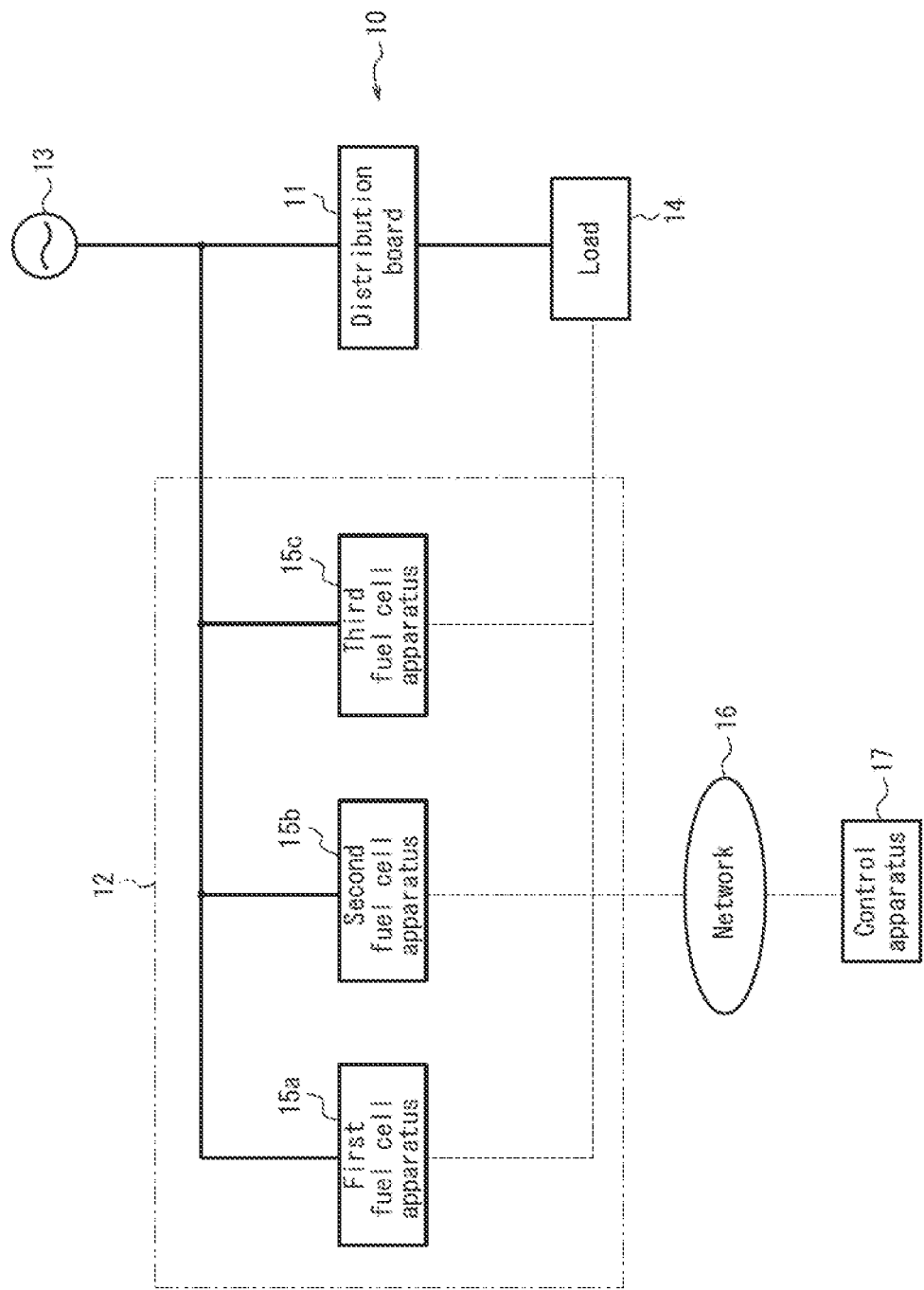
FIG. 1 is a functional block diagram illustrating the schematic configuration of a power supply system that executes a control method according to an embodiment of the present disclosure.

In FIG. 1, the solid lines connecting functional blocks indicate the flow of power. Furthermore, the dashed lines connecting functional blocks indicate the flow of control signals or of communicated information. These dashed lines may correspond to wired or wireless communication. Various methods including infrared communication, ZigBee® (ZigBee is a registered trademark in Japan, other countries, or both) and other such short distance communication methods, power line communication (PLC), and the like may be used to communicate control signals or information.

A power supply system 10 includes a distribution board 11, a fuel cell system 12, and the like.

The distribution board 11 divides the power supplied from the fuel cell system 12 and a commercial power grid 13 into a plurality of branches and distributes the power to a load 14. The load 14 is a power load that consumes power. The load 14 may, for example, be equipment that consumes power and is used inside the same consumer facility, such as air conditioning equipment, lighting, a refrigerator, and the like. The load 14 includes a power sensor and can transmit information indicating its own power consumption to the fuel cell system 12.

The fuel cell system 12 includes a plurality of fuel cell apparatuses, for example three fuel cell apparatuses constituted by a first fuel cell apparatus 15a, a second fuel cell apparatus 15b, and a third fuel cell apparatus 15c. Each fuel cell apparatus can correspond to the "one fuel cell apparatus" in the present disclosure. The first fuel cell apparatus 15a, second fuel cell apparatus 15b, and third fuel cell apparatus 15c output power to the distribution board 11 in parallel. The first fuel cell apparatus 15a, second fuel cell apparatus 15b, and third fuel cell apparatus 15c can communicate with each other and with the load 14, and also with a control apparatus 17 over a network 16 such as the Internet. The control apparatus 17 is a device for controlling the fuel cell system 12 and, for example, transmits a stop instruction or the like for a particular fuel cell apparatus to the fuel cell system 12.

Figure 2:
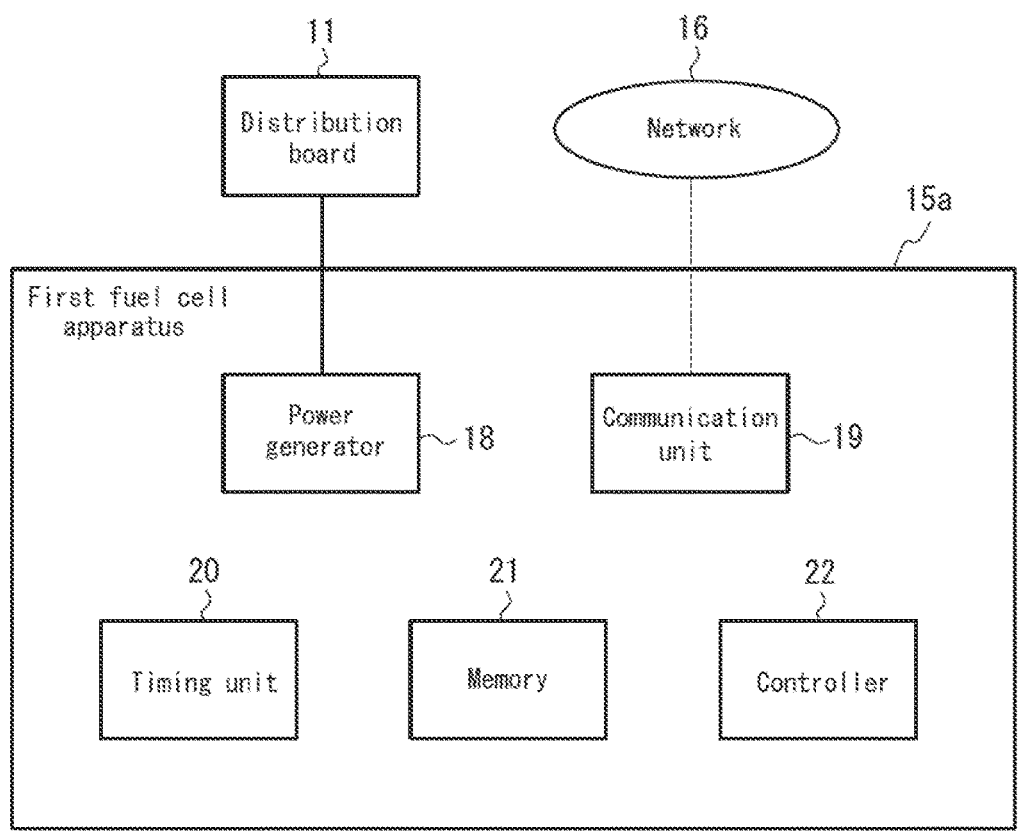
FIG. 2 is a functional block diagram schematically illustrating the configuration of a fuel cell apparatus.

The configuration of the first fuel cell apparatus 15a is described below with reference to FIG. 2. Since the configuration of the second fuel cell apparatus 15b and third fuel cell apparatus 15c is the same as that of the first fuel cell apparatus 15a, a description thereof is omitted. The first fuel cell apparatus 15a is, for example, a solid oxide fuel cell apparatus but may also be a different type of fuel cell apparatus capable of continuous operation. The first fuel cell apparatus 15a can switch between a stopped state, a standby state, and a power generation state.

The first fuel cell apparatus 15a includes a power generator 18, a communication unit 19 (transmitter, receiver), a timing unit 20, a memory 21, a controller 22, and the like.

The power generator 18 includes a reformer, a cell stack, and an inverter, for example. The reformer reforms fuel gas to produce hydrogen. The cell stack generates direct current (DC) power using hydrogen. The inverter converts DC power to alternating current (AC) power. The power generator 18 outputs the AC power converted by the inverter to the distribution board 11.

The communication unit 19 communicates, i.e. transmits and receives, a variety of information between the first fuel cell apparatus 15a and external devices. For example, the communication unit 19 transmits distinguishing information of the first fuel cell apparatus 15a to other fuel cell apparatuses, e.g. to the second fuel cell apparatus 15b and the third fuel cell apparatus 15c in a first embodiment. The distinguishing information is information for determining whether each of a plurality of fuel cell apparatuses is to be a master apparatus or a slave apparatus. For example, the distinguishing information in the first embodiment is the cumulative operating time of the respective first fuel cell apparatus 15a. The communication unit 19 also receives the distinguishing information of other fuel cell apparatuses from the other fuel cell apparatus, e.g. from the second fuel cell apparatus 15b and the third fuel cell apparatus 15c in the first embodiment.

Furthermore, in the case of the master apparatus, the respective communication unit 19 transmits control information for controlling other fuel cell apparatuses to the other fuel cell apparatuses. In the case of a slave apparatus, the respective communication unit 19 receives the control information for the slave apparatus from the fuel cell apparatus that is the master apparatus.

Furthermore, the communication unit 19 receives the power consumption of the load 14 from the load 14. The communication unit 19 also transmits information to the control apparatus 17 indicating whether the respective apparatus is the master apparatus or a slave apparatus. The communication unit 19 also receives the control information of the respective apparatus and of other fuel cell apparatuses from the control apparatus 17.

The timing unit 20 is, for example, a timer that, under the control of the below-described controller 22, measures the cumulative operating time spent in the power generation state from the below-described reset time onward.

The memory 21 is configured using any memory resource, such as a flash memory. The memory 21 stores characteristics of the respective apparatus such as the rated output of the respective apparatus, various information necessary for processing by the controller 22 such as a threshold with which the distinguishing information is compared, programs executed by the controller 22, and the like.

The controller 22 is configured by a dedicated microprocessor or a universal central processing unit (CPU) that reads a program for executing particular functions. The controller 22 controls the components constituting the respective apparatus and controls other fuel cell apparatuses.

For example, the controller 22 selects one fuel cell apparatus from among the plurality of fuel cell apparatuses in the fuel cell system 12 to be a master apparatus. The controller 22 also recognizes fuel cell apparatuses other than the master apparatus as slave apparatuses. The master apparatus controls the plurality of fuel cell apparatuses in the fuel cell system 12 collectively. The slave apparatuses operate on the basis of control by the master apparatus.

For selection of the master apparatus, the controller 22 acquires the cumulative operating time of the respective apparatus from the timing unit 20 as the distinguishing information and causes the communication unit 19 to transmit the distinguishing information to other fuel cell apparatuses. The controller 22 also causes the communication unit 19 to receive the distinguishing information of each of the other fuel cell apparatuses.

The controller 22 receives the distinguishing information from the other fuel cell apparatuses. Upon doing so, the controller 22 compares the cumulative operating time of a plurality of operable fuel cell apparatuses within the fuel cell system 12. The controller 22 then selects the fuel cell apparatus with the shortest cumulative operating time to be the master apparatus. In the case of not being selected as the master apparatus, the controller 22 recognizes the respective apparatus as a slave apparatus. In the case of selecting the respective apparatus to be the master apparatus, the controller 22 transmits information indicating that it is the master apparatus to the other fuel cell apparatuses and to the control apparatus 17 via the communication unit 19.

Furthermore, in the case of selecting the respective apparatus to be the master apparatus, the controller 22 periodically compares the cumulative operating time, which is the distinguishing information of the respective apparatus, with a threshold stored in the memory 21. When the cumulative operating time exceeds the threshold, the controller 22 determines to switch the respective apparatus to the stopped state.

The controller 22 determines to switch the respective apparatus to the stopped state. At this time, the controller 22 transmits control information, via the communication unit 19, to cause other fuel cell apparatuses to select a master apparatus. The controller 22 of the other fuel cell apparatuses receives the control information. The controller 22 of the other fuel cell apparatuses then transmits and receives distinguishing information and selects a new master apparatus on the basis of the distinguishing information. The controller 22 of the fuel cell apparatus that is the current master apparatus resets the cumulative operating time of the timing unit 20 of the respective apparatus to zero when the fuel cell apparatus selected to be the new master apparatus switches to the power generation state. The controller 22 of the fuel cell apparatus that is the current master apparatus may also receive information indicating selection as the master apparatus in the case of being in the power generation state. At this time, the controller 22 of the fuel cell apparatus that is the current master apparatus resets the cumulative operating time of the timing unit 20 of the respective apparatus to zero.

Furthermore, in the case of selecting the respective apparatus to be the master apparatus, the controller 22 acquires control information to cause the respective apparatus to switch to the stopped state. This control information is acquired from the control apparatus 17 or from an input apparatus connected via the communication unit 19 or the like. Upon receiving control information to switch the respective apparatus to the stopped state, the controller 22 transmits control information, via the communication unit 19, to other fuel cell apparatuses to cause the other fuel cell apparatuses to select a master apparatus. Upon receiving the control information, the controller 22 of the other fuel cell apparatuses transmits and receives distinguishing information and selects a new master apparatus on the basis of the distinguishing information. The controller 22 of the fuel cell apparatus that is the current master apparatus resets the cumulative operating time of the timing unit 20 of the respective apparatus to zero when the fuel cell apparatus selected to be the new master apparatus switches to the power generation state. The controller 22 of the fuel cell apparatus that is the current master apparatus may also receive information indicating selection as the master apparatus in the case of being in the power generation state. At this time, the controller 22 of the fuel cell apparatus that is the current master apparatus resets the cumulative operating time of the timing unit 20 of the respective apparatus to zero.

Furthermore, in the case of selecting the respective apparatus to be the master apparatus, the controller 22 generates control information to cause other fuel cell apparatuses to switch between the stopped state, the standby state, and the power generation state. This control information is generated on the basis of control information received from the control apparatus 17 or from an input apparatus connected to the first fuel cell apparatus 15*a*. The controller 22 transmits the generated control information to each fuel cell apparatus via the communication unit 19.

Furthermore, in the case of selecting the respective apparatus to be the master apparatus, the controller 22 periodically receives the power consumption of the load 14. While prioritizing maintenance of the power generation state or standby state of the respective apparatus, the controller 22 then determines the power generation amount and the switching between the stopped state, the standby state, and the power generation state of each fuel cell apparatus in accordance with a predetermined method, such as having the fuel cell system 12 as a whole perform a load-following operation. The controller 22 then generates control information for performing operation in the determined state. The controller 22 transmits the generated control information to each fuel cell apparatus via the communication unit 19.

Figure 3:
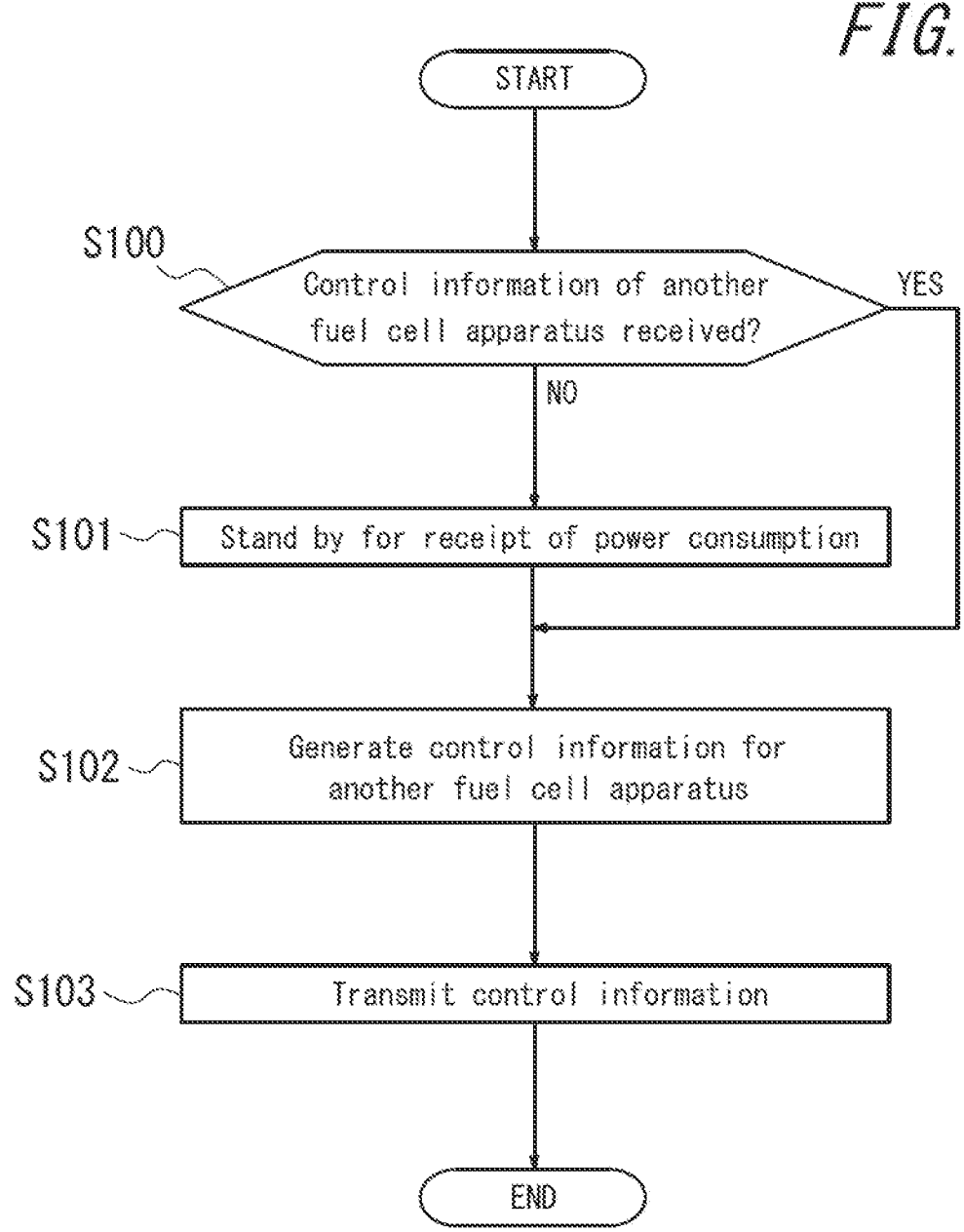
FIG. 3 is a flowchart illustrating operation control executed by a controller of the fuel cell apparatus.

Next, the operation control of the fuel cell system 12 executed by the controller 22 of the fuel cell apparatus that selects itself to be the master apparatus is described with reference to the flowchart in FIG. 3. The controller 22 starts operation control of the fuel cell system 12 at predetermined intervals, such as every minute.

In step S100, the controller 22 judges whether control information for causing other fuel cell apparatuses to switch between the stopped state, the standby state, and the power generation state has been received from the control apparatus 17 or an input apparatus. When the control information has been received, the process skips step S101 and proceeds to step S102. When the control information has not been received, the process proceeds to step S101.

In step S101, the controller 22 waits until reception of information indicating the power consumption from the load 14. Upon reception of information indicating the power consumption, the process proceeds to step S102.

In step S102, the controller 22 generates control information to cause each of the other fuel cell apparatuses to perform at least one of the power generation amount and switching the state. This control information is generated on the basis of control information to cause the other fuel cell apparatuses to switch between the stopped state, the standby state, and the power generation state or information indicating the power consumption. Once the control information is generated, the process proceeds to step S103.

In step S103, the controller 22 transmits the control information generated in step S102 to each fuel cell apparatus via the communication unit 19. Upon transmitting the control information, the controller 22 terminates the operation processing of the fuel cell system 12.

Figure 4:
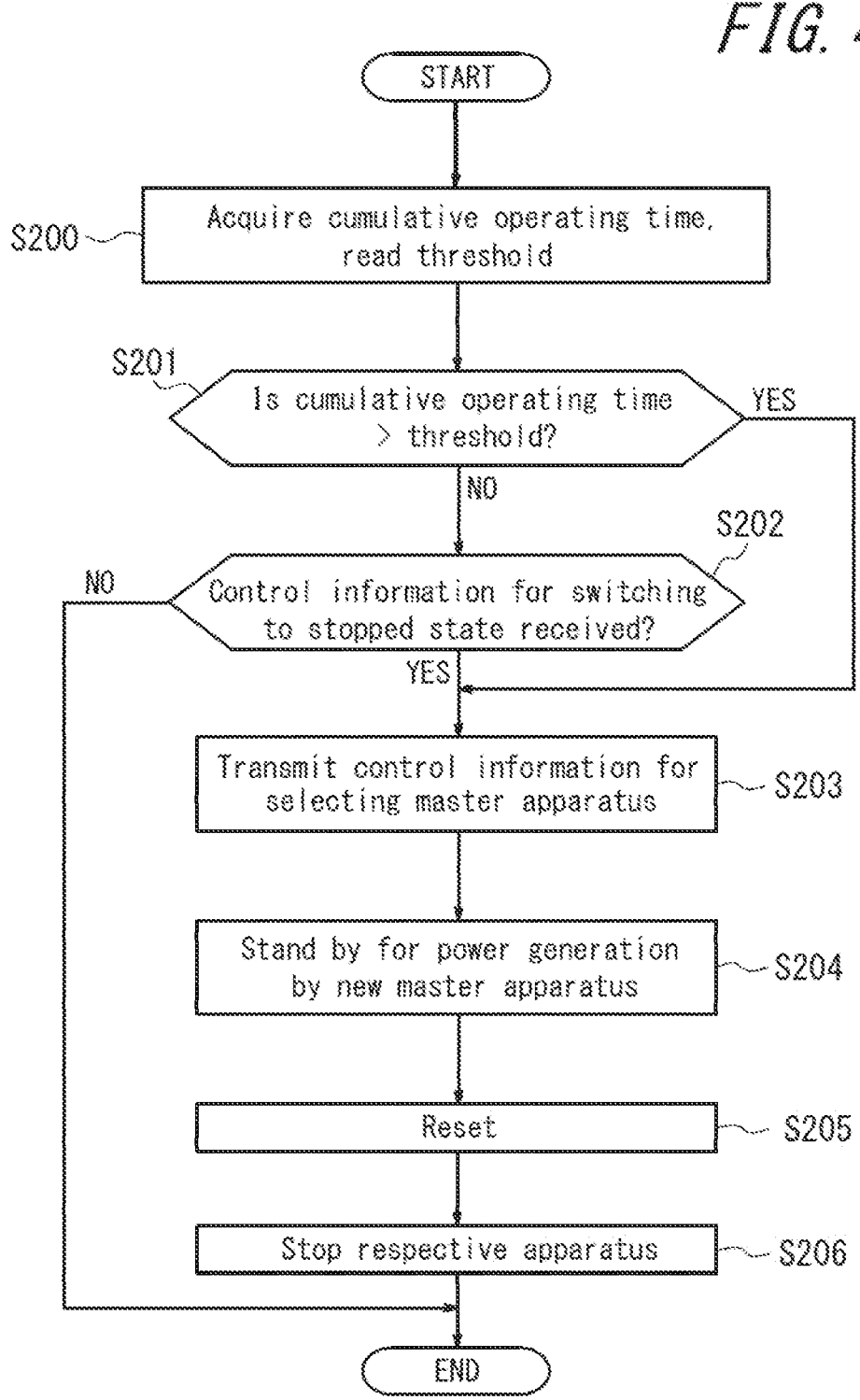
FIG. 4 is a flowchart illustrating stop determination control executed by the controller of the fuel cell apparatus.

Next, the stop determination control of the fuel cell apparatus, executed by the respective controller 22 that selects itself to be the master apparatus, is described with reference to the flowchart in FIG. 4. The controller 22 starts the stop determination control at predetermined intervals, such as every 10 minutes.

In step S200, the controller 22 acquires the cumulative operating time from the timing unit 20 and reads a threshold from the memory 21. Once the cumulative operating time is acquired and the threshold is read, the process proceeds to step S201.

In step S201, the controller 22 determines whether the cumulative operating time exceeds the threshold. When the cumulative operating time exceeds the threshold, the process skips step S202 and proceeds to step S203. When the cumulative operating time is equal to or less than the threshold, the process proceeds to step S202.

In step S202, the controller 22 determines whether control information to cause the respective apparatus, which is the master apparatus, to switch to the stopped state has been acquired from the control apparatus 17 or the like. When the control information has not been acquired, the controller 22 terminates the stop determination control. When the control information has been acquired, the process proceeds to step S203.

In step S203, the controller 22 generates control information to cause other fuel cell apparatuses that are slave apparatuses to select a master apparatus and causes the communication unit 19 to transmit the control information. Upon transmission of the control information, the process proceeds to step S204.

In step S204, the controller 22 stands by until the fuel cell apparatus selected to be the new master apparatus enters the power generation state. Upon reception of information indicating that the fuel cell apparatus selected to be the new master apparatus is in the power generation state, the process proceeds to step S205.

In step S205, the controller 22 resets the cumulative operating time of the respective timing unit 20 to zero. After the cumulative operating time is reset, the process proceeds to step S206.

In step S206, the controller 22 switches the respective apparatus to the stopped state. Upon switching to the stopped state, the controller 22 terminates the stop determination control.

Figure 5:
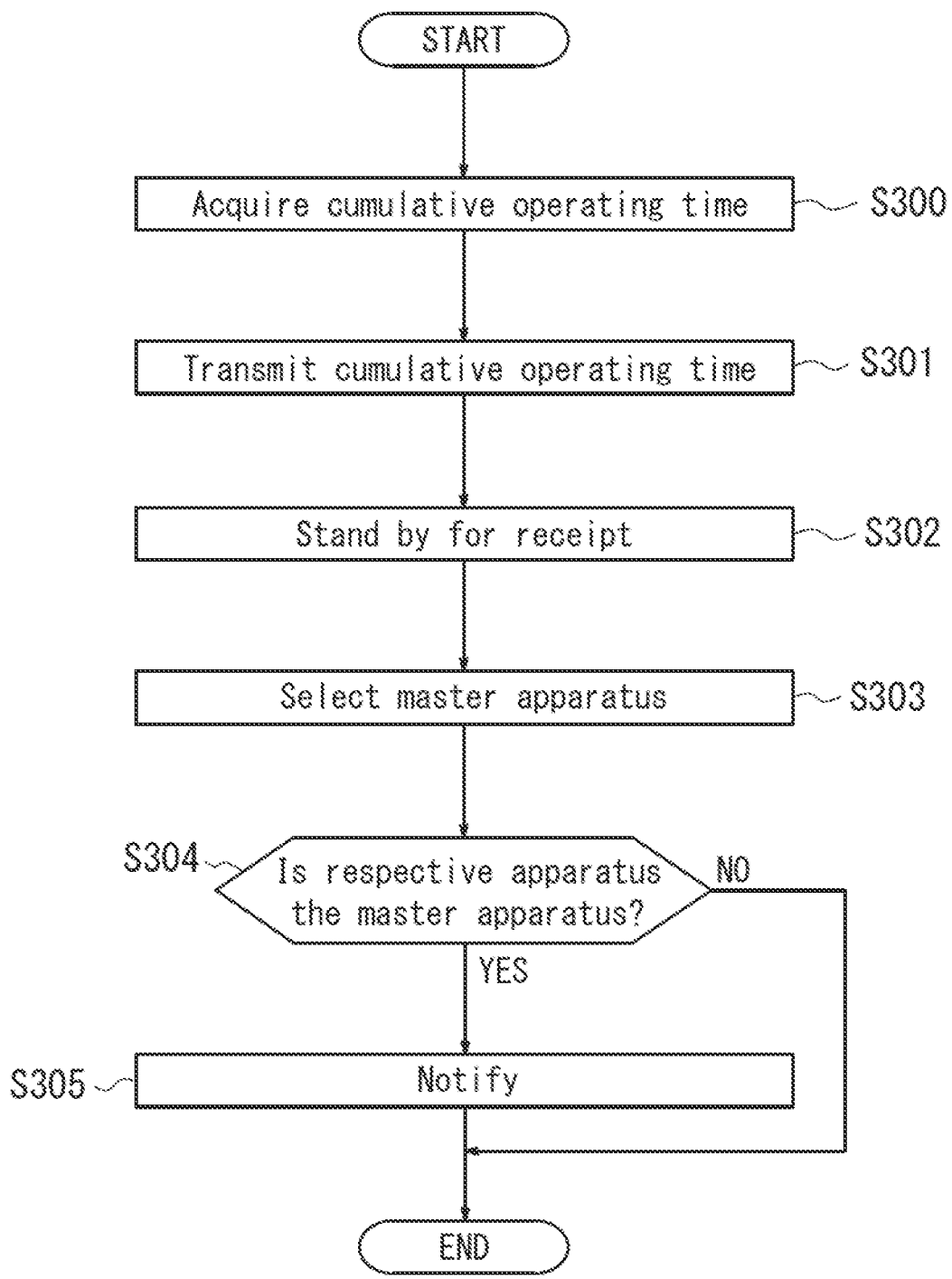
FIG. 5 is a flowchart illustrating selection control executed by the controller of the fuel cell apparatus.

Next, the selection control to select a new master apparatus, executed by the respective controller 22 of a fuel cell apparatus that recognized itself as a slave apparatus, is described with reference to the flowchart in FIG. 5. The controller 22 starts the selection control upon receiving control information for selection of a master apparatus from the fuel cell apparatus that is the master apparatus.

In step S300, the controller 22 acquires the cumulative operating time from the timing unit 20. Once the cumulative operating time is acquired, the process proceeds to step S301.

In step S301, the controller 22 transmits the cumulative operating time acquired in step S300 to other fuel cell apparatuses as the distinguishing information. Upon transmission of the distinguishing information, the process proceeds to step S302.

In step S302, the controller 22 stands by for the distinguishing information from each of the other fuel cell apparatuses. Upon reception of the distinguishing information from each of the other fuel cell apparatuses, the process proceeds to step S303.

In step S303, the controller 22 selects a master apparatus on the basis of the cumulative operating time of the respective apparatus acquired in step S300 and the cumulative operating time of each of the other fuel cell apparatuses corresponding to the distinguishing information received in step S302. Upon selection, processing proceeds to step S304.

In step S304, the controller 22 determines whether the master apparatus selected in step S303 is the respective apparatus. When the respective apparatus is not the master apparatus, the controller 22 terminates the selection control. When the respective apparatus is the master apparatus, the process proceeds to step S305.

In step S305, when the respective apparatus has entered the power generation state, the controller 22 transmits information to notify the other fuel cell apparatuses and the control apparatus 17 that the respective apparatus is the master apparatus. The case in which the respective apparatus has entered the power generation state refers, for example, to completion of switching from the stopped state or the standby state to the power generation state, or to being selected as the master apparatus while already in the power generation state. After transmission of the information, the selection control terminates.

According to the fuel cell apparatus of the first embodiment, a master apparatus is selected from among a plurality of fuel cell apparatuses on the basis of the cumulative operating time. Accordingly, it is unlikely that only a particular fuel cell apparatus will be the master apparatus. Further, in a case where only a particular fuel cell apparatus is used as the master apparatus, when maintenance on the master apparatus requires the master apparatus, including the controller 22, to be stopped, the other fuel cell apparatuses are less likely to be stopped as well. As a result, the utilization rate of the plurality of fuel cell apparatuses as a whole increases. Furthermore, if only a particular fuel cell apparatus is used as the master apparatus, only the master apparatus is constantly operating, except during maintenance. The lifespan of the master apparatus decreases in such a case, but in the first embodiment, the reduction in lifespan is curtailed.

Furthermore, the control method of a fuel cell apparatus of the first embodiment selects the fuel cell apparatus with the shortest cumulative operating time to be the master apparatus. As a result, each fuel cell apparatus among the plurality of fuel cell apparatuses is selected on average to be the master apparatus. This allows a further increase the utilization rate and control of the reduction in lifespan.

Furthermore, the control method of a fuel cell apparatus of the first embodiment selects a new master apparatus when the cumulative operating time of the fuel cell apparatus selected to be the master apparatus exceeds a threshold, thereby optimizing the timing for switching the master apparatus. Accordingly, a drop in the utilization rate due to the master apparatus suddenly stopping or the like can be controlled, as can a reduction in lifespan of the master apparatus.

Furthermore, the control method of a fuel cell apparatus of the first embodiment selects a new master apparatus when the controller of the fuel cell apparatus set to the master apparatus receives control information for switching the fuel cell apparatus to the stopped state. Accordingly, a reduction in the utilization rate can also be controlled in the case of stopping the fuel cell apparatus for maintenance or the like.

Next, a second embodiment of the present disclosure is described. In the second embodiment, the type of distinguishing information differs from the first embodiment. The second embodiment is described below, focusing on the differences from the first embodiment. The same reference signs are used for components with the same configuration as in the first embodiment.

In the second embodiment, the configuration of the power supply system 10, the fuel cell system 12, and the first fuel cell apparatus 15a is the same as in the first embodiment. In the second embodiment, the configuration of the power generator 18, the timing unit 20, and the memory 21 in the first fuel cell apparatus 15a, the second fuel cell apparatus 15b, and the third fuel cell apparatus 15c is the same as in the first embodiment.

In the second embodiment, the communication unit 19 transmits the rated power of the respective apparatus to the second fuel cell apparatus 15b and the third fuel cell apparatus 15c as the distinguishing information. Furthermore, the communication unit 19 receives the rated power of the second fuel cell apparatus 15b and the third fuel cell apparatus 15c as distinguishing information. Other than the distinguishing information, the communication unit 19 in the second embodiment sends and receives the same information as in the first embodiment.

In the second embodiment, the controller 22 selects one fuel cell among the plurality of fuel cell apparatuses in the fuel cell system 12 to be the master apparatus and recognizes the fuel cell apparatuses other than the master apparatus as slave apparatuses.

To select the master apparatus in the second embodiment, the controller 22 reads the rated power of the respective apparatus as the distinguishing information from the memory 21 and causes the communication unit 19 to transmit the distinguishing information to the other fuel cell apparatuses. The controller 22 also causes the communication unit 19 to receive the rated power of each of the other fuel cell apparatuses as the distinguishing information.

In the second embodiment, the controller 22 compares the rated power of a plurality of operable fuel cell apparatuses within the fuel cell system 12 upon receiving the distinguishing information from the other fuel cell apparatuses. The controller 22 then selects one fuel cell apparatus to be the master apparatus on the basis of the comparison. In the case of selecting the respective apparatus to be the master apparatus, the controller 22 in the second embodiment transmits information indicating that it is the master apparatus to the other fuel cell apparatuses and to the control apparatus 17 via the communication unit 19. In the case of not being selected as the master apparatus, the controller 22 recognizes the respective apparatus as a slave apparatus.

In the second embodiment, the controller 22 selects the fuel cell apparatus with the largest rated output to be the master apparatus at the startup time of the fuel cell system 12.

Furthermore, in the second embodiment, the controller 22 causes the communication unit 19 to transmit and receive distinguishing information periodically on the basis of the power consumption of the load 14 acquired via the communication unit 19. The controller 22 then selects the fuel cell apparatus with the optimal rated output for the power consumption to be the master apparatus. The optimal rated output for the power consumption is the rated power, among the rated powers of the plurality of fuel cell apparatuses, that is greater than and closest to the power consumption. Alternatively, the optimal rated power for the power consumption may be the rated power that is greater than and closest to the sum of the power consumption and a predetermined value.

Furthermore, in the case of selecting the respective apparatus to be the master apparatus, the controller 22 in the second embodiment causes the communication unit 19 to transmit control information to other fuel cell apparatuses to cause the other fuel cell apparatuses to select a master apparatus upon receiving control information from the control apparatus 17 or the input apparatus to switch the respective apparatus to the stopped state. Upon receiving the control information, the controller 22 of the other fuel cell apparatuses in the second embodiment transmits and receives distinguishing information and selects a new master apparatus on the basis of the distinguishing information.

Furthermore, in the case of selecting the respective apparatus to be the master apparatus, the controller 22 in the second embodiment transmits control information for other fuel cell apparatuses to each fuel cell apparatus via the communication unit 19 on the basis of control information received from the control apparatus 17 or the input apparatus. The control information for the other fuel cell apparatuses is control information to cause the other fuel cell apparatuses to switch between the stopped state, the standby state, and the power generation state.

Furthermore, in the second embodiment, the controller 22 periodically receives the power consumption of the load 14. The controller 22 then prioritizes maintenance of the power generation state or standby state of the respective apparatus. At this time, the controller 22 determines the power generation amount and the switching between the stopped state, the standby state, and the power generation state of each fuel cell apparatus in accordance with a predetermined method. The predetermined method is a method in which the fuel cell system 12 as a whole performs a load-following operation. The controller 22 then generates control information for performing operation in the determined state. With the predetermined method, control information is generated so that the priority of maximizing the power generation amount and of switching to the power generation state increases as the rated power is greater.

Figure 6:
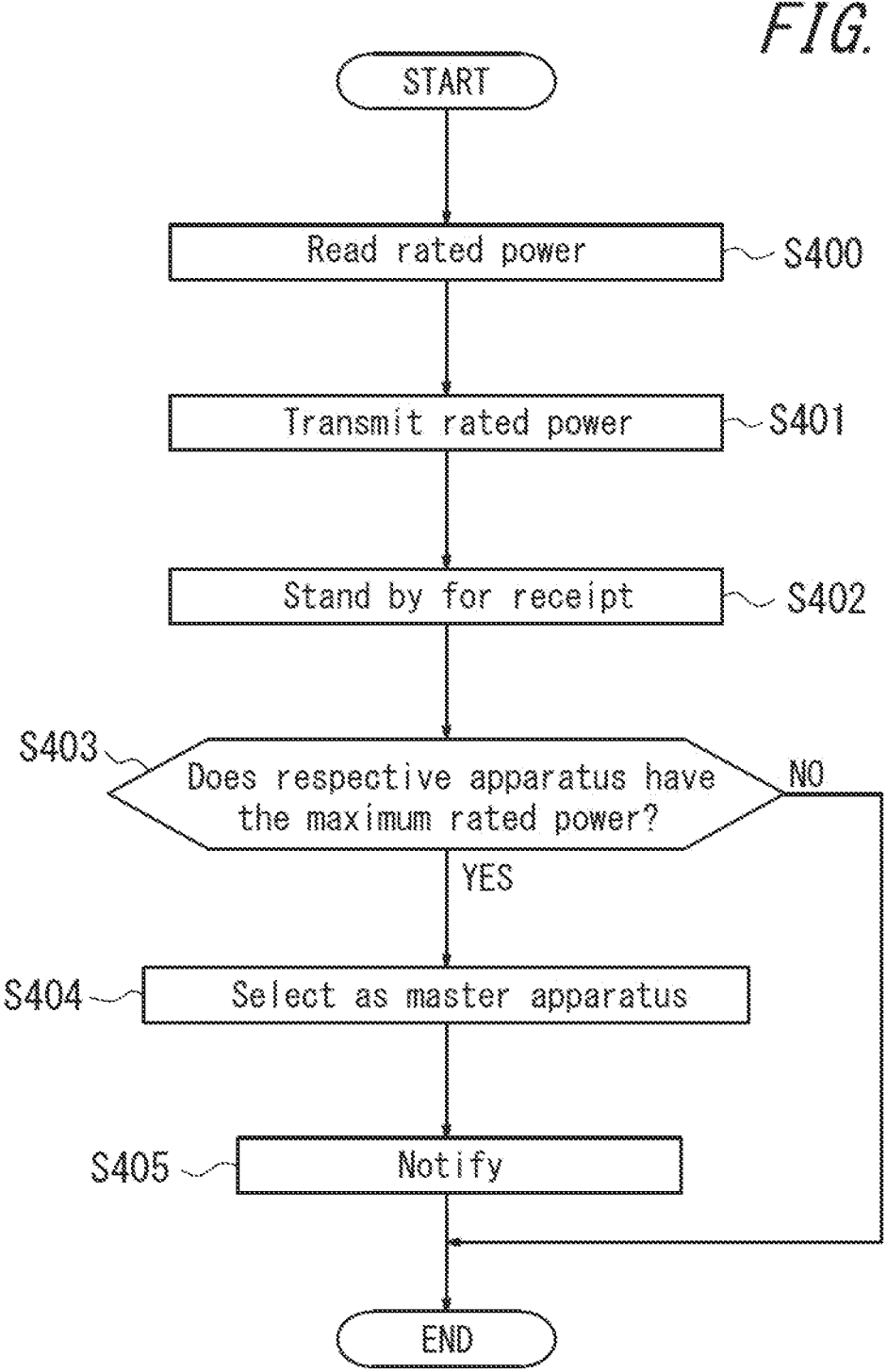
FIG. 6 is a flowchart illustrating selection control executed by the controllers of all of the fuel cell apparatuses in the fuel cell system.

Next, the selection control to select a master apparatus, executed by the controller 22 of all of the fuel cell apparatuses at the startup time of the fuel cell system 12, is described with reference to the flowchart in FIG. 6.

In step S400, the controller 22 reads the rated power from the memory 21. Once the rated power is acquired, the process proceeds to step S401.

In step S401, the controller 22 transmits the rated power read in step S400 to the other fuel cell apparatuses as the distinguishing information. Upon transmission of the distinguishing information, the process proceeds to step S402.

In step S402, the controller 22 stands by for the distinguishing information from each of the other fuel cell apparatuses. Upon reception of the distinguishing information from each of the other fuel cell apparatuses, the process proceeds to step S403.

In step S403, the controller 22 determines whether the rated power of the respective apparatus read in step S400 is the maximum rated power in a comparison with each of the rated powers of the other fuel cell apparatuses corresponding to the distinguishing information received in step S402. When the rated power of the respective apparatus is not the maximum rated power, the controller 22 terminates the selection control. When the rated power is the maximum rated power, the process proceeds to step S404.

In step S404, the controller 22 selects the respective apparatus to be the master apparatus. In the case of selecting the respective apparatus to be the master apparatus, the controller 22 may further determine the priority of maximizing the power generation amount and of switching to the power generation state for other fuel cell apparatuses. Upon selection as the master apparatus, the process proceeds to step S405.

In step S405, the controller 22 transmits information to notify the other fuel cell apparatuses and the control apparatus 17 that the respective apparatus is the master apparatus. After transmission of the information, the controller 22 terminates the selection control.

Figure 7:
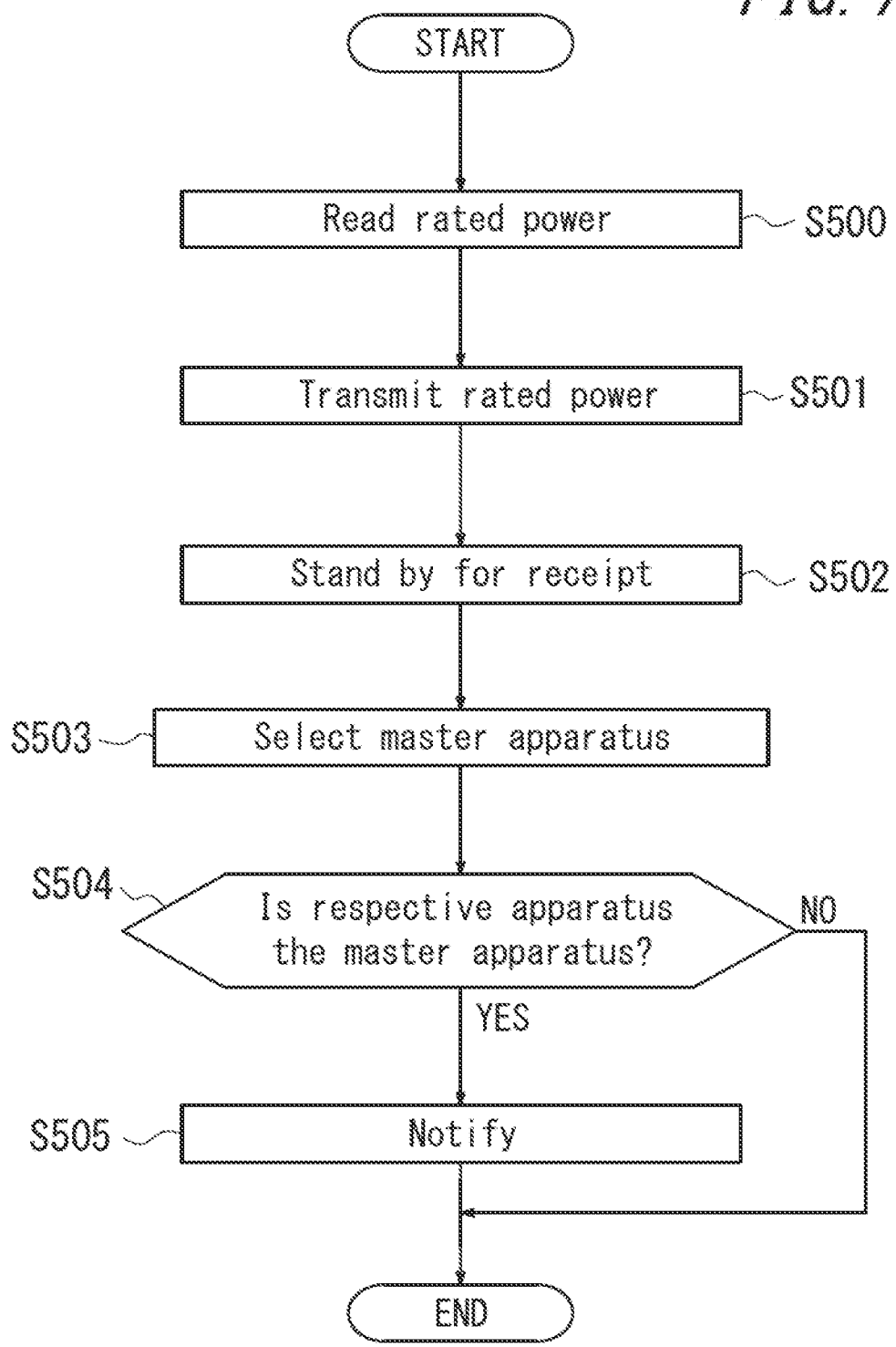
FIG. 7 is a flowchart illustrating selection control executed by the controllers of all of the fuel cell apparatuses in the fuel cell system.

Next, the selection control to select a master apparatus, executed by the controller 22 of all of the fuel cell apparatuses during operation of the fuel cell system 12, is described with reference to the flowchart in FIG. 7. The controller 22 starts selection processing during operation of the fuel cell system 12 at predetermined intervals, such as once every hour, or when the current master apparatus receives control information for switching the current master apparatus to the stopped state.

In steps S500 to S502, the controller 22 performs similar processing to the processing of steps S400 to S402 in the selection control at the startup time of the fuel cell system 12. Upon reception of the distinguishing information from each of the other fuel cell apparatuses, the process proceeds to step S503.

In step S503, the controller 22 selects the fuel cell apparatus with the optimal rated power to be the master apparatus on the basis of the current power consumption of the load 14 acquired via the communication unit 19. After selection of the master apparatus, the process proceeds to step S504.

In step S504, the controller 22 determines whether the master apparatus selected in step S503 is the respective apparatus. When the respective apparatus is not the master apparatus, the controller 22 terminates the selection control. When the respective apparatus is the master apparatus, the process proceeds to step S505.

In step S505, when the respective apparatus has entered the power generation state, the controller 22 transmits information to notify the other fuel cell apparatuses and the control apparatus 17 that the respective apparatus is the master apparatus. The case in which the respective apparatus has entered the power generation state refers, for example, to completion of switching from the stopped state or the standby state to the power generation state, or to being selected as the master apparatus while already in the power generation state. The controller 22 may further determine the priority of maximizing the power generation amount and of switching to the power generation state for other fuel cell apparatuses. After transmission of the information, the controller 22 terminates the selection control.

According to the above-described control method of a fuel cell apparatus of the second embodiment, a master apparatus is selected from among a plurality of fuel cell apparatuses on the basis of the rated power. Accordingly, a particular fuel cell apparatus can be prevented from exclusively being the master apparatus. Therefore, the utilization rate of the plurality of fuel cell apparatuses as a whole increases. The control method of a fuel cell apparatus of the second embodiment also controls the reduction in lifespan of the master apparatus. Furthermore, with the control method of a fuel cell apparatus of the second embodiment, the controller selects a new master apparatus upon receiving control information for switching the fuel cell apparatus set as the master apparatus to the stopped state. Accordingly, a reduction in the utilization rate can also be controlled in the case of stopping the fuel cell apparatus for maintenance or the like.

Furthermore, the control method of a fuel cell apparatus of the second embodiment selects the fuel cell apparatus with the greatest rated power as the master apparatus at the startup time of the fuel cell system 12. At the startup time of the fuel cell system 12, startup of the fuel cell apparatus with a large rated power is typically prioritized to allow the maximum supply of power to the load 14, whose power consumption is unknown. Therefore, a fuel cell apparatus considered capable of switching to the power generation state can be selected to be the master apparatus even when the power consumption of the load 14 is unknown.

Furthermore, the control method of a fuel cell apparatus of the second embodiment selects the fuel cell apparatus with the optimal rated power for the power consumption of the load 14 to be the master apparatus. Accordingly, a fuel cell apparatus in the power generation state can be selected to be the master apparatus while causing a fuel cell apparatus with good efficiency for the power consumption of the load 14 to generate power on a priority basis.

The present disclosure is based on the drawings and on embodiments, but it should be noted that a person of ordinary skill in the art could easily make a variety of modifications and adjustments based on the present disclosure. Therefore, such changes and modifications are to be understood as included within the scope of the present disclosure.

For example, the cumulative operating time is used as the distinguishing information in the first embodiment, and the rated power is used as the distinguishing information in the second embodiment, but the master apparatus can also be selected by using a combination of both as the distinguishing information.

In the first embodiment and the second embodiment, the load 14 includes a power sensor and transmits its own power consumption to the fuel cell system 12, but the technical scope of the present disclosure is not limited to this configuration. For example, a configuration may be adopted to provide a power sensor in the main portion of the distribution board 11 or the like, detect the overall power consumption of the load 14, and transmit the power consumption to the fuel cell system 12.

REFERENCE SIGNS LIST

10 Power supply system
11 Distribution board
12 Fuel cell system
13 Commercial power grid
14 Load
15*a* First fuel cell apparatus
15*b* Second fuel cell apparatus
15*c* Third fuel cell apparatus
16 Network
17 Control apparatus
18 Power generator
19 Communication unit
20 Timing unit
21 Memory
22 Controller

The invention claimed is:

1. A fuel cell apparatus that is one fuel cell apparatus among a plurality of fuel cell apparatuses for providing power to a load in a consumer facility, the one fuel cell apparatus comprising:
    a timing unit configured to measure a cumulative operating time of the one fuel cell apparatus;
    a memory configured to store a rated output of the one fuel cell apparatus;
    a transmitter configured to transmit, as distinguishing information, at least one of the cumulative operating time measured by the timing unit and the rated output stored in the memory to other fuel cell apparatuses among the plurality of fuel cell apparatuses that supplies power together with the one fuel cell apparatus to the load in the consumer facility;
    a receiver configured to receive at least one of a cumulative operating time and a rated output of the other fuel cell apparatuses from the other fuel cell apparatuses as distinguishing information for the other fuel cell apparatuses; and
    a controller configured to select a fuel cell apparatus among the plurality of fuel cell apparatuses to be a master apparatus on the basis of the distinguishing information of the one fuel cell apparatus and the distinguishing information received from the other fuel cell apparatuses, wherein the master apparatus controls itself and other fuel cell apparatuses in accordance with power consumption of the load.

2. The fuel cell apparatus of claim 1, wherein when the controller selects a fuel cell apparatus with the shortest cumulative operating time to be the master apparatus and in a case where the one fuel cell apparatus is selected to be the master apparatus, the controller switches the one fuel cell apparatus to a stopped state and causes the transmitter to transmit control information to cause other fuel cell apparatuses to select a master apparatus other than the one fuel cell apparatus upon the cumulative operating time exceeding a threshold.

3. The fuel cell apparatus of claim 1, wherein the controller selects a fuel cell apparatus with the maximum rated power to be the master apparatus at a startup time of a fuel cell system comprising the plurality of fuel cell apparatuses.

4. The fuel cell apparatus of claim 1, wherein upon acquiring a power consumption of the load, the controller selects a fuel cell apparatus with a rated output greater than and closest to the power consumption to be the master apparatus.

5. A fuel cell system comprising:
    a plurality of fuel cell apparatuses for providing power to a load of a consumer facility, wherein
    each fuel cell apparatus in the plurality of fuel cell apparatuses comprises a timing unit configured to measure a cumulative operating time of the respective fuel cell apparatus, a memory configured to store a rated output of the respective fuel cell apparatus, a transmitter configured to transmit, as distinguishing information, at least one of the cumulative operating time measured by the timing unit and the rated output stored in the memory to other fuel cell apparatuses other than the respective fuel cell apparatus among the plurality of fuel cell apparatuses, a receiver configured to receive distinguishing information for the other fuel cell apparatuses from the other fuel cell apparatuses, and a controller configured to select a fuel cell apparatus among the plurality of fuel cell apparatuses to be a master apparatus on the basis of the distinguishing information for the respective fuel cell apparatus and the distinguishing information received from the other fuel cell apparatuses.

6. The fuel cell system of claim 5, wherein when the controller selects a fuel cell apparatus with the shortest cumulative operating time to be the master apparatus and in a case where the respective fuel cell apparatus is selected to be the master apparatus, the controller switches the respective fuel cell apparatus to a stopped state and transmits control information to cause other fuel cell apparatuses to select a master apparatus other than the respective fuel cell apparatus upon a cumulative operating time exceeding a threshold.

7. The fuel cell system of claim 5, wherein the controller of the respective fuel cell apparatus performs control to select a fuel cell apparatus with the maximum rated power to be the master apparatus at a startup time of the fuel cell system comprising the plurality of fuel cell apparatuses.

8. The fuel cell system of claim 5, wherein upon acquiring a power consumption of the load, the controller of the respective fuel cell apparatus performs control to select a fuel cell apparatus with a rated output greater than and closest to the power consumption to be the master apparatus.

9. A control method of a fuel cell apparatus, the control method comprising:
   a transmitting step including causing each fuel cell apparatus among a plurality of fuel cell apparatuses to transmit, as distinguishing information, at least one of a cumulative operating time and a rated power of the respective fuel cell apparatus to other fuel cell apparatuses among the plurality of fuel cell apparatuses, wherein the plurality of fuel cell apparatuses is configured to provide power to a load in a consumer facility;
   a receiving step including causing each fuel cell apparatus among the plurality of fuel cell apparatuses to receive distinguishing information transmitted by other fuel cell apparatuses among the plurality of fuel cell apparatuses; and
   a selecting step including causing each fuel cell apparatus among the plurality of fuel cell apparatuses to select a fuel cell apparatus among the plurality of fuel cell apparatuses to be a master apparatus on the basis of the distinguishing information for the respective fuel cell apparatus and the distinguishing information received from the other fuel cell apparatuses.

10. The control method of a fuel cell apparatus of claim 9, wherein the master apparatus controls itself and other fuel cell apparatuses in accordance with power consumption of the load.

11. The control method of a fuel cell apparatus of claim 9, wherein in the selecting step, each fuel cell apparatus among the plurality of fuel cell apparatuses is caused to select a fuel cell apparatus with the shortest cumulative operating time to be the master apparatus.

12. The control method of a fuel cell apparatus of claim 11, wherein the transmitting step, the receiving step, and the selecting step are performed upon a cumulative operating time of the fuel cell apparatus selected to be the master apparatus exceeding a threshold.

13. The control method of a fuel cell apparatus of claim 11, wherein the transmitting step, the receiving step, and the selecting step are performed upon receiving control information which causes the fuel cell apparatus selected to be the master apparatus to switch to a stopped state.

14. The control method of a fuel cell apparatus of claim 9, wherein in the selecting step, each fuel cell apparatus among the plurality of fuel cell apparatuses is caused to select a fuel cell apparatus with the maximum rated power to be the master apparatus at a startup time of a fuel cell system comprising the plurality of fuel cell apparatuses.

15. The control method of a fuel cell apparatus of claim 14, further comprising:
   acquiring a power consumption of the load, wherein
   in the selecting step, each fuel cell apparatus among the plurality of fuel cell apparatuses is caused, upon acquiring a power consumption of the load, to select a fuel cell apparatus with a rated output greater than and closest to the power consumption to be the master apparatus.

* * * * *